United States Patent
Fukai et al.

(10) Patent No.: US 8,899,771 B2
(45) Date of Patent: Dec. 2, 2014

(54) ILLUMINATION DEVICE, DISPLAY DEVICE, AND TELEVISION RECEPTION DEVICE

(71) Applicant: Sharp Kabushiki Kaisha, Osaka (JP)

(72) Inventors: Hiroki Fukai, Osaka (JP); Ryo Yamakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/361,673

(22) PCT Filed: Nov. 26, 2012

(86) PCT No.: PCT/JP2012/080441
§ 371 (c)(1), (2), (4) Date: May 29, 2014

(87) PCT Pub. No.: WO2013/080909
PCT Pub. Date: Jun. 6, 2013

(65) Prior Publication Data
US 2014/0327832 A1    Nov. 6, 2014

(30) Foreign Application Priority Data
Nov. 30, 2011   (JP) ................... 2011-262468

(51) Int. Cl.
*F21S 4/00*  (2006.01)
*F21V 13/04*  (2006.01)

(52) U.S. Cl.
CPC ...................................... *F21V 13/04* (2013.01)
USPC ......... 362/97.1; 362/97.3; 362/613; 362/632; 362/623

(58) Field of Classification Search
CPC .................... G02F 1/133603; G02F 1/133605; F21V 13/04
USPC ............... 362/97.1–97.4, 613, 623, 632–634
See application file for complete search history.

(56) References Cited

U.S. PATENT DOCUMENTS

| 7,377,692 B1 * | 5/2008 | Troncoso et al. ............. 383/110 |
| 8,140,909 B2 * | 3/2012 | Luan et al. ...................... 714/42 |
| 2012/0087122 A1 | 4/2012 | Takeuchi et al. |
| 2012/0087126 A1 | 4/2012 | Takeuchi et al. |

FOREIGN PATENT DOCUMENTS

JP    2011-34956    2/2011

* cited by examiner

*Primary Examiner* — Anabel Ton
(74) *Attorney, Agent, or Firm* — Chen Yoshimura LLP

(57) ABSTRACT

A backlight device 12 includes: a chassis having a bottom plate and side plates that stand towards the front of the bottom plate from the edges of the bottom plate, the face on one side of the bottom plate being a light-output part; an LED substrate disposed on the front surface of the bottom plate; LEDs 24 arranged on a plate face oriented toward the light-output part of the LED substrate and arranged so that the light-output part is on the light-emitting side thereof; a plurality of diffusion lenses 27 for covering the light-emitting side of the plurality of LEDs and diffusing the light from the LEDs 24; a first reflecting sheet 29 provided with light source insertion holes through which the LEDs 24 are inserted at positions corresponding to the LEDs 24, the first reflecting sheet being laid over the front surface of the bottom plate and over the LED substrate; and a second reflecting sheet 30 arranged so as to protrude in the direction in which the side plates rise, the ends of the second reflecting sheet 30 being held between the first reflecting sheet 29 and the plurality of diffusion lenses 27, the second reflecting sheet 30 being held over the first reflecting sheet 29 by coming in contact with the diffusion lenses 27 and the first reflecting sheet 29.

13 Claims, 11 Drawing Sheets

ILLUMINATION DEVICE, DISPLAY DEVICE, AND TELEVISION RECEPTION DEVICE

TECHNICAL FIELD

The present invention relates to an illumination device, a display device, and a television receiver.

BACKGROUND ART

In recent years, flat panel display devices that use flat panel display elements such as liquid crystal panels and plasma display panels are replacing cathode ray tube displays in display elements for image display devices such as television receivers, allowing image display devices to be made thinner. Liquid crystal panels used in liquid crystal display devices do not emit light on their own; therefore, it is necessary to provide a separate backlight device as an illumination device. As an example of such backlight devices, a direct-lit backlight device that directly supplies light to the liquid crystal panel from the rear surface side thereof is known.

Among direct-lit backlight devices, a configuration is known in which a reflective sheet for reflecting light emitted from a light source and traveling in a direction opposite to the display surface back towards the display surface is laid on a light source substrate and on the bottom plate of a chassis, which is a case. In a backlight device configured in this manner, in some cases, the reflective sheet warps in the vicinity of the light sources due to heat generated thereby, resulting in portions of the reflective sheet in the vicinity of the light sources to rise up. If the portions of the reflective sheet near the light sources rise up, then some of the light emitted from the light sources and traveling towards the display surface is blocked by the raised reflective sheet, resulting in uneven brightness in the display surface. An example of a direct-lit backlight device that can mitigate uneven brightness in the display surface resulting from the reflective sheet rising in this manner is disclosed in Patent Document 1, for example.

RELATED ART DOCUMENT

Patent Document

Patent Document 1: Japanese Patent Application Laid-Open Publication No. 2011-34956

Problems to be Solved by the Invention

However, in the backlight device of Patent Document 1 above, a plurality of fixing members are fixed onto the light source substrates and the bottom plate of the chassis, and rising of the reflective sheet is mitigated by supporting portions of the reflective sheet using these fixing members. As a result, a large number of fixing members were necessary during the manufacturing process for the backlight device, resulting in additional effort expended in order to provide these fixing members. Furthermore, the tips of the fixing members protrude from the rear side of the bottom plate of the chassis, which meant it was difficult to install circuit substrates and the like on the rear side of the bottom plate.

SUMMARY OF THE INVENTION

The techniques disclosed in the present specification were made in view of the above-mentioned problems. An object of the techniques disclosed in the present specification is to provide a direct-lit illumination device with which it is possible to prevent or mitigate uneven brightness in the display surface using a simple configuration.

Means for Solving the Problems

The technology disclosed in the present specification: relates to an illumination device, including: a chassis having a plate-shaped portion and side plates that rise up from edges of the plate-shaped portion on one surface thereof; a plurality of light source substrates disposed on the one surface of the plate-shaped portion; a plurality of light sources disposed on the light source substrates, the light sources outputting light in a direction of light output; a plurality of diffusion lenses respectively covering the plurality of light sources to diffuse light from the light sources; a reflective sheet disposed on the one surface of the plate-shaped portion and the light source substrates, the reflective sheet having light source insertion holes that correspond in position to the light sources to insert the light sources therethrough; and a flat spring member over the reflective sheet, the flat spring member generally protruding outward from a plane defined by the reflective sheet and having a pair of ends that oppose each other, one of the ends being held by the reflective sheet and one of the plurality of diffusion lenses, another end of the flat spring member being held by the reflective sheet and another of the diffusion lenses so that the ends of the flat spring member are respectively in contact with the one and another diffusion lenses and the reflective sheet to secure the reflective sheet onto the light source substrates, the flat spring member being reflective.

According to such an illumination device, by holding the second reflective sheet (flat spring member) on the first reflective sheet in the periphery of the diffusion lens, rising of portions of the first reflective sheet in the periphery of the light sources, such portions being susceptible to rising, is prevented or mitigated by the second reflective sheets. Also, the second reflective sheet protrudes in the direction in which the side plates rise (display surface side) and thus, light reaching the second reflective sheet is reflected towards the direction in which the side plates rise, or in other words, the display surface side. Thus, it is possible to have light from the light sources travel towards the display surface side while preventing or mitigating rising of the first reflective sheet in the vicinity of the light sources. Thus, it is possible to prevent or mitigate uneven brightness in the display surface with a simple configuration.

The flat spring member may be disposed in an extended state such that an elastic recovery force is generated so that each of the pair of ends thereof may press the reflective sheet towards the plate-shaped portion by a reaction force resulting from each of the pair of ends being held by the reflective sheet and the one and another diffusion lenses to be in elastic contact with the diffusion lenses.

According to such an illumination device, the second reflective sheet disposed in an extended state so as to generate an elastic recovery force therein is in elastic contact with the diffusion lens, and thus, a reaction force towards the first reflective sheet acts on each of the pair of ends that are opposing sides of the second reflective sheet. As a result, portions of the first reflective sheet in the periphery of the diffusion lenses are effectively pressed towards the plate-shaped portion, and thus, rising of the first reflective sheet in the vicinity of the light sources can be further prevented or mitigated.

The flat spring member may have a crease provided between and along the pair of ends thereof, the the flat spring member being folded along the crease in a mountain fold so as to have a mountain shape in a cross-sectional view.

According to this configuration, by having the inclined surface of the second reflective sheet folded in a mountain fold in contact with the diffusion lens, the second reflective sheet bends slightly towards the first reflective sheet, and thus, it is possible to press the first reflective sheet by the second reflective sheet effectively. Also, by having light reaching the second reflective sheet reach the inclined face of the second reflective sheet folded in a mountain fold, light is effectively reflected towards the direction in which the side plates rise (display surface side). In this manner, the rising of the first reflective sheet in the vicinity of the light sources is prevented or mitigated, which allows the realization of a specific configuration for causing light from the light sources to travel towards the display surface side.

The crease may be provided along a center line between the pair of ends.

According to this configuration, by having the tip of the second reflective sheet having a mountain shape in a cross-sectional view be along the center between the plurality of diffusion lenses adjacent to and surrounding the second reflective sheet, it is possible to have light that has reached the inclined surfaces of the second reflective sheet from the diffusion lenses to be directed evenly towards the display surface side.

The flat spring member may be disposed so as to overlap at least four of the diffusion lenses.

According to this configuration, the second reflective sheet is in contact with many diffusion lenses, and thus, the first reflective sheet can be effectively pressed by the second reflective sheet.

Support legs that support the diffusion lenses may be provided on the light source substrates, and the pair of ends of the flat spring member may be provided with cutouts.

According to this configuration, by providing the cutouts such that the support legs are held in the pair of ends that are opposing sides of the second reflective sheet while realizing a configuration in which the diffusion lenses are supported by the support legs, it is possible to hold the second reflective sheet between the first reflective sheet and the diffusion lenses with ease.

The cutouts may be large enough to engage a plurality of the support legs that support the plurality of diffusion lenses.

According to this configuration, the second reflective sheet is restricted in movement in a direction along the surface of the first reflective sheet, and thus, it is possible to have the pair of ends that are the opposing sides of the second reflective sheet be difficult to remove from between the first reflective sheet and the diffusion lenses.

A plurality of the flat spring members may be arranged at equal intervals while respectively overlapping the plurality of diffusion lenses.

According to this configuration, it is possible to dispose the plurality of second reflective sheets with ease on the first reflective sheet in the chassis.

The light sources and the light source substrates may be disposed such that the light sources are in a matrix when the plate-shaped portion is viewed in a plan view.

According to this configuration, it is possible to have the plurality of second reflective sheet be disposed evenly in a plan view, and it is possible to have light from the plurality of light sources be reflected evenly on the display surface side by the second reflective sheets.

The flat spring member may be white on a surface thereof facing the direction of light output.

According to this configuration, it is possible to increase the rate of reflection of light by the second reflective sheet.

The techniques disclosed in the present specification can be expressed as a display device that includes a display panel that displays images using light from the above-mentioned illumination device. Also, a display device that uses a liquid crystal panel having liquid crystal as the display panel is novel and useful. A television receiver that includes the above-mentioned display device is also novel and useful.

Effects of the Invention

According to the techniques disclosed in the present specification, it is possible to provide a direct-lit backlight device with which it is possible to prevent or mitigate uneven brightness in the display surface, with a simple configuration.

DETAILED DESCRIPTION OF EMBODIMENTS

Embodiment 1

Figure 2:
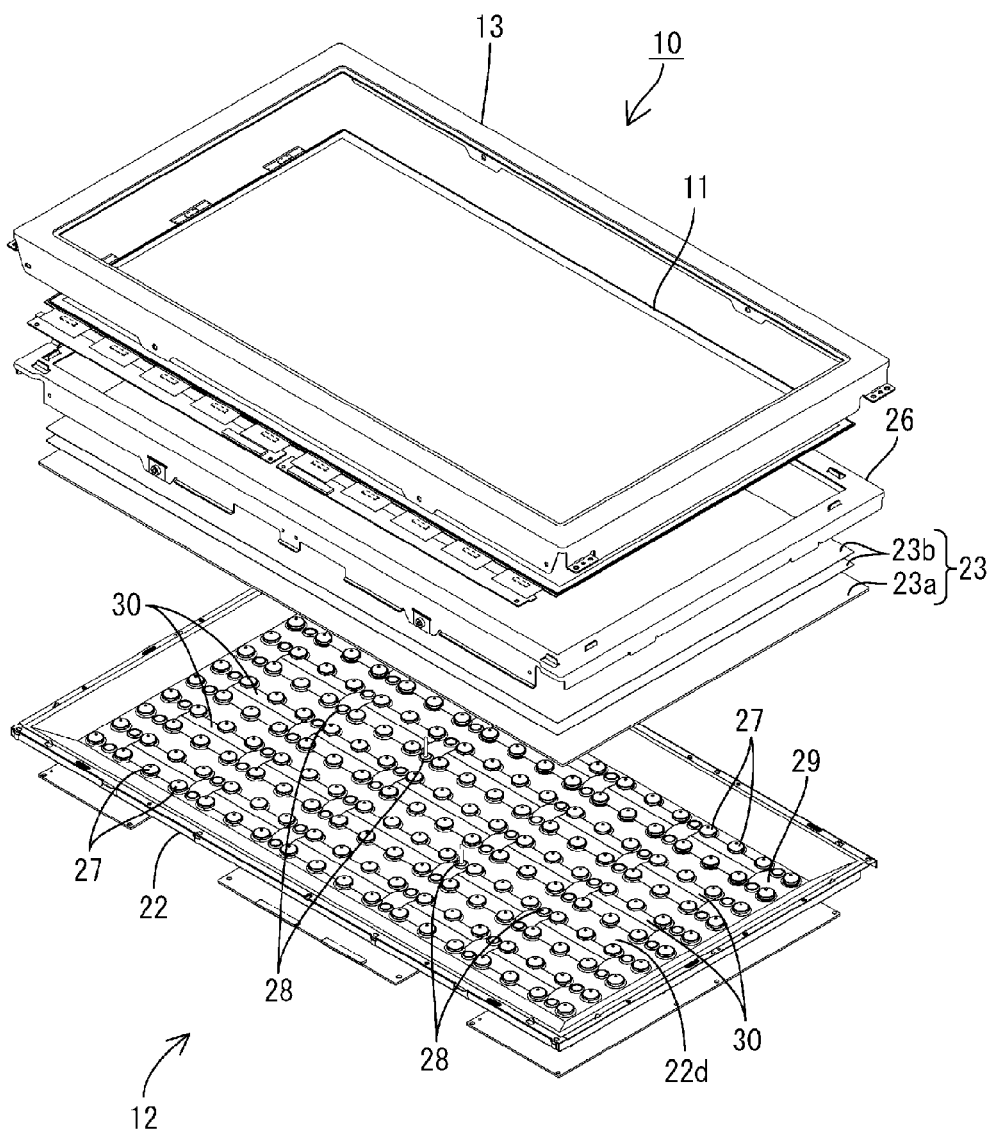
FIG. 2 is an exploded perspective view of a liquid crystal display device 10.

Embodiment 1 will be described with reference to the drawings. In the present embodiment, a liquid crystal display device 10 will be described as an example. The drawings indicate an X axis, a Y axis, and a Z axis in a portion of the drawings, and each of the axes indicates the same direction for the respective drawings. The upper side of FIG. 2 is the front side, and the lower side is the rear side.

(Television Receiver)

Figure 1:
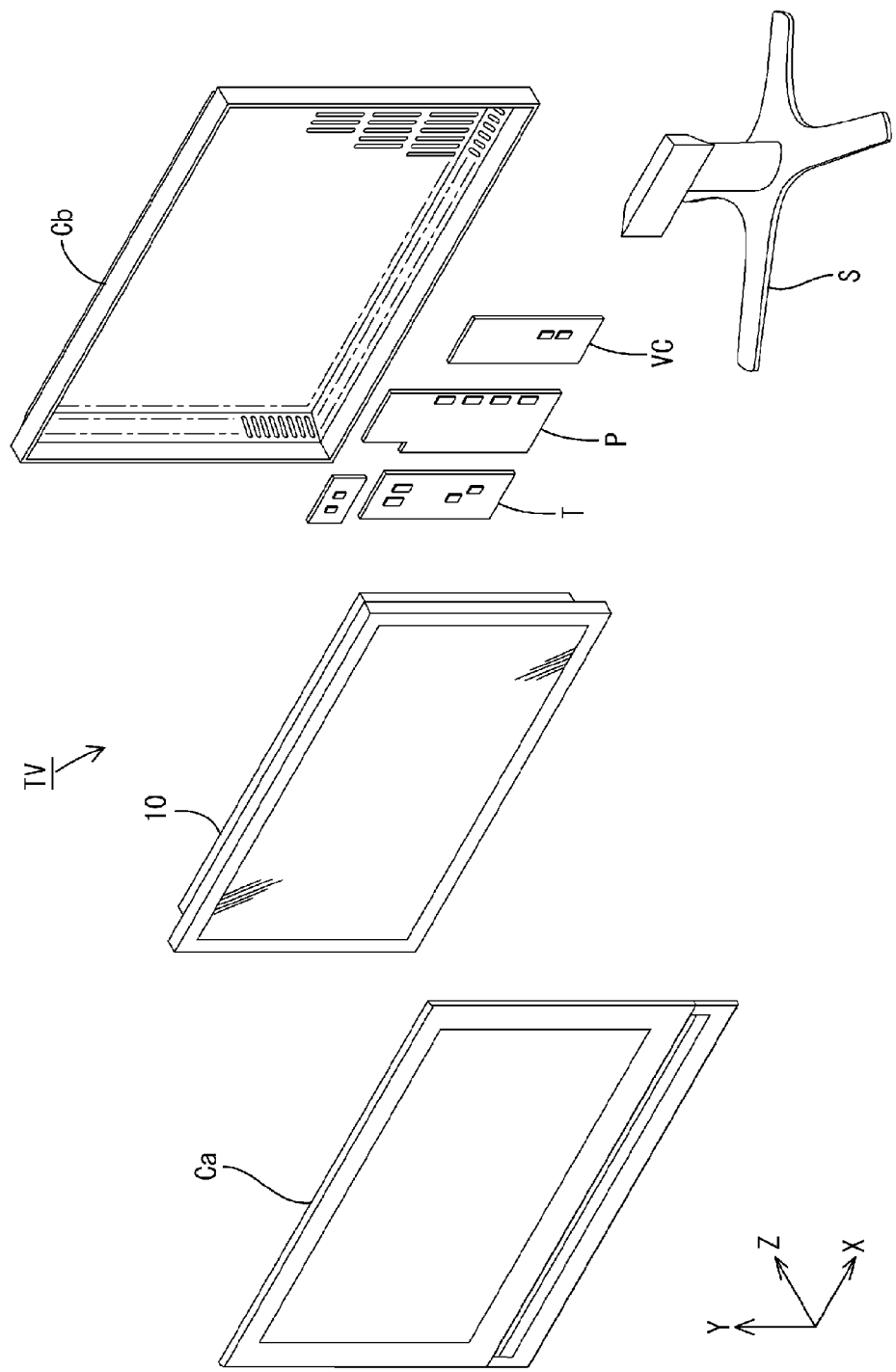
FIG. 1 is an exploded perspective view of a television receiver TV according to Embodiment 1.

As shown in FIG. 1, a television receiver TV of the present embodiment includes: a liquid crystal display device 10, which is a display device; front and rear cabinets Ca and Cb for housing the liquid crystal display device 10 therebetween; a power supply circuit substrate P for supplying power; a tuner T (receiver) that can receive television image signals; an image conversion circuit substrate VC that converts the television image signal outputted from the tuner T into an image signal for the liquid crystal display device 10; and a stand S.

The liquid crystal display device 10 is formed in a horizontally long quadrilateral (rectangular) shape as a whole, and is disposed such that the long side direction thereof matches the horizontal direction (X axis direction) and the short side direction thereof matches the vertical direction (Y axis direction), respectively. As shown in FIG. 2, the liquid crystal display device 10 includes a liquid crystal panel 11 that is a display panel, and a backlight device 12 (an example of an illumination device) that is an external light source, and these are held together by a frame-shaped bezel 13 and the like.

(Liquid Crystal Panel)

In the liquid crystal panel 11, a pair of transparent (having a high degree of light transmission) glass substrates are bonded together with a prescribed gap therebetween, and a liquid crystal layer (not shown) is sealed between the glass substrates. One of the glass substrates is provided with switching elements (such as TFTs) connected to source lines and gate lines that intersect each other, pixel electrodes connected to the switching elements, an alignment film, and the like, and the other glass substrate is provided with color filters including respective colored portions of R (red), G (green), B (blue), and the like, which are in a prescribed arrangement, an opposite electrode, an alignment film, and the like. Of these, the source lines, the gate lines, the opposite electrode, and the like are supplied with image data and various control signals necessary in order to display images from a driver circuit substrate that is not shown in drawings. Polarizing plates (not shown) are disposed on the respective outer sides of the glass substrates.

(Backlight Device)

Next, a configuration of the backlight device 12 of the liquid crystal display device 10 will be explained. As shown in FIG. 2, the backlight device 12 includes a substantially box-shaped chassis 22 having a light-output portion 22d facing a light-output side (liquid crystal panel 11 side), optical members 23 disposed so as to cover the light-output portion 22d of the chassis 22, and a frame 26 that, together with the chassis 22, sandwiches the outer edges of the optical members 23, the outer edges of the frame 26 being disposed along the outer edges of the chassis 22. The chassis 22 includes LEDs 24 (refer to FIGS. 4 and 5) disposed directly below the optical members 23 (liquid crystal panel 11) so as to face the optical members 23, LED substrates 25 on which the LEDs 24 are mounted, and diffusion lenses 27 attached to the LED substrates 25 in positions where the LEDs 24 are disposed. Accordingly, the backlight device 12 of the present embodiment is of a so-called direct lighting type. Also, within the chassis 22, a protective member 28 that can be held between the LED substrate 25 and the chassis 22, and a first reflective sheet 29 and a plurality of second reflective sheets 30 that reflect light in the chassis 22 towards the optical members 23 are provided. Next, each component of the backlight device 12 will be described in detail below.

(Chassis)

Figure 3:
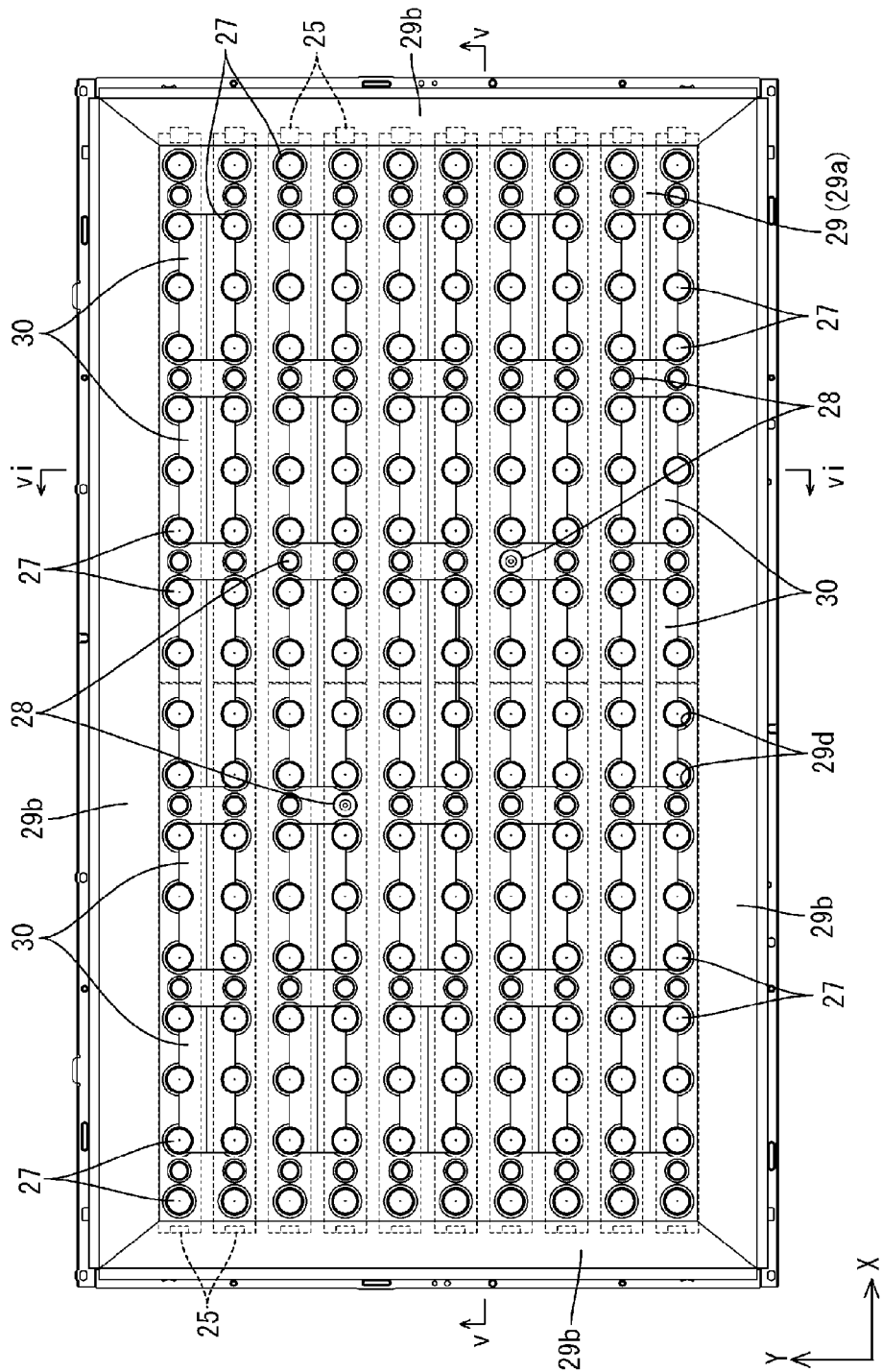
FIG. 3 is a plan view of a backlight device 12.
Figure 5:
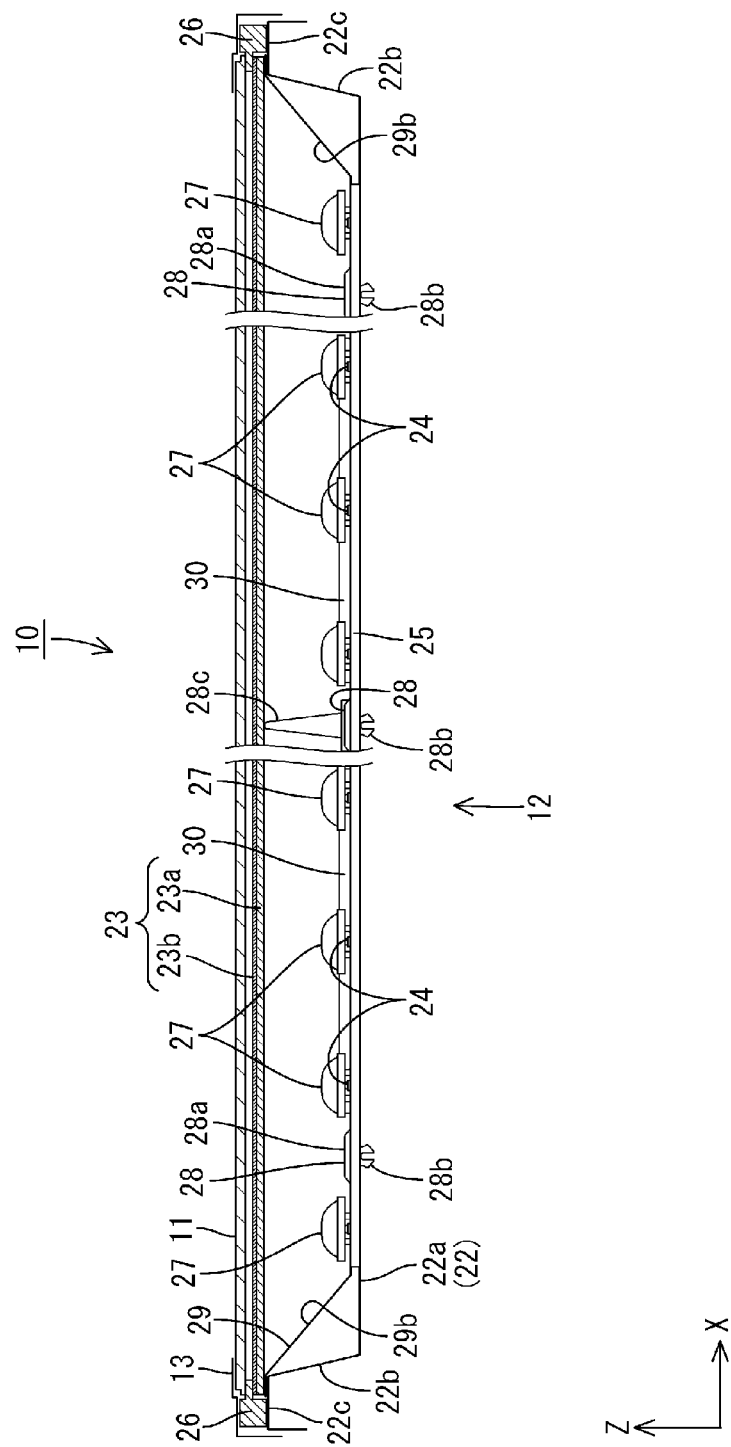
FIG. 5 is a cross-sectional view of FIG. 3 along the line v-v, which is along the long side direction of the backlight device 12.

The chassis 22 is made of metal, and, as shown in FIGS. 3 and 5, includes a bottom plate 22a that is a horizontally long quadrilateral (rectangle) similar to the liquid crystal panel 11, and side plates 22b that respectively rise up towards the front (light-output side) from the respective edges (one pair of long edges and one pair of short edges) of the bottom plate 22a. Overall, the chassis 22 is formed into a shallow box shape with the front side open. In the chassis 22, the long side direction thereof matches the X axis direction (horizontal direction), and the short side direction thereof matches the Y axis direction (vertical direction). The frame 26 and the optical members 23, which will be described below, can be placed, from the front side, on respective supporting plates 22c of the chassis 22. The frame 26 is screwed onto the respective supporting plates 22c. The bottom plate 22a of the chassis 22 has formed therein openings that are attachment holes 22d for attaching the holding members 28. A plurality of the attachment holes 22d are dispersed throughout the bottom plate 22a in positions where the holding members 28 are to be attached.

(Optical Members)

Figure 4:
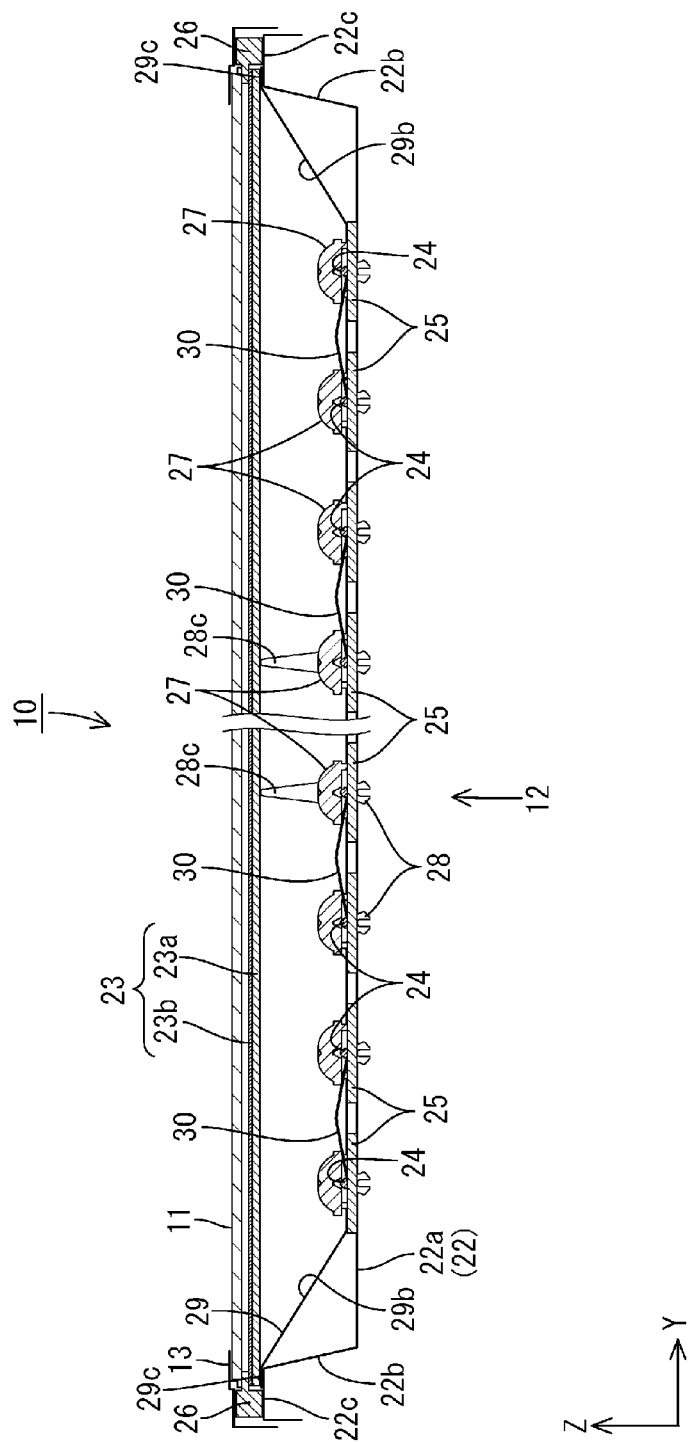
FIG. 4 shows a cross-sectional view of FIG. 3 along the line iv-iv, which is along the short side direction of the backlight device 12.

As shown in FIG. 2, the optical members 23 are in a horizontally elongated rectangular shape in a plan view, as in the liquid crystal panel 11 and the chassis 22. As shown in FIGS. 4 and 5, the outer edges of the optical members 23 are placed on the supporting plates 22c, thereby covering the light-output portion 22d of the chassis 22 and being interposed between the liquid crystal panel 11 and the diffusion lenses 27 (LED substrates 25). The optical members 23 include a diffusion plate 23a disposed on the rear side (towards the diffusion lenses 27, opposite to the side towards which light is emitted), and optical sheets 23b disposed on the front side (liquid crystal panel 11 side, the side toward which light is emitted). The diffusion plate 23a has a configuration in which a plurality of diffusion particles are dispersed inside a plate-shaped base material made of an almost completely transparent resin having a prescribed thickness, and has the function of diffusing light that is transmitted therethrough. The optical sheets 23b are sheet-shaped and thinner than the diffusion plate 23a, and the two optical sheets 23b are stacked, one on top of the other. Specific types of the optical sheets 23b include a diffusion sheet, a lens sheet, a reflective polarizing sheet, and the like, for example, and it is possible to appropriately choose any of these as the optical sheets 23b.

(Frame)

As shown in FIG. 2, the frame 26 has a frame shape along the outer edges of the liquid crystal panel 11 and the optical members 23. The outer edges of the optical members 23 are sandwiched between the frame 26 and the respective supporting plates 22c (see FIGS. 4 and 5). The frame 26 can receive the outer edges of the liquid crystal panel 11 from the rear side thereof, and can sandwich the outer edges of the liquid crystal panel 11 with the bezel 13 that is disposed to the front thereof (see FIGS. 4 and 5).

(LEDs)

The LEDs 24 are mounted on the LED substrates 25 (an example of a light source substrate), and are so-called top type LEDs in which light-emitting surfaces are on the side opposite to the mounting surface on which the LEDs 24 are mounted. Each LED 24 includes an LED chip (not shown) that is a light-emitting source that emits blue light, and a green phosphor and a red phosphor as phosphors that emit light by being excited by the blue light. Specifically, each LED 24 has a configuration in which an LED chip made of an InGaN type material, for example, is sealed by a resin material onto a substrate that is attached to the LED substrate 25. The LED chip mounted on the substrate has a primary luminescence wavelength in a range of 420 nm to 500 nm, i.e., the blue wavelength region, and can emit highly pure blue light (single color blue light). The specific primary luminescence wavelength of the LED chip is preferably 451 nm, for example. On the other hand, the resin material that seals the LED chip has the green phosphor that emits green light by being excited by blue light emitted from the LED chip, and the red phosphor that emits red light by being excited by the blue light emitted from the LED chip, the green phosphor and the red phosphor being dispersed in the resin material at a prescribed ratio. By the blue light (light having a blue component) emitted from the LED chip, the green light (light having a green component) emitted from the green phosphor, and the red light (light having a red component) emitted from the red phosphor, the LED 24 can emit light of a prescribed color as a whole such as white light or white light with a bluish tone, for example.

Because yellow light can be obtained by mixing the light from the green phosphor having a green component and the light from the red phosphor having a red component, it can also be said that this LED 24 emits a mixture of the blue component light from the LED chip and yellow component light. The chromaticity of the LED 24 changes based on the absolute value or the relative value of the quantity of green phosphor and red phosphor included, for example, and thus, it is possible to adjust the chromaticity of the LED 24 by appropriately adjusting the amount of green phosphor and red phosphor included. In the present embodiment, the green phosphor has a primary luminescence peak in the green wavelength region from 500 nm to 570 nm inclusive, and the red phosphor has a primary luminescence peak in the red wavelength region from 600 nm to 780 nm inclusive.

(LED Substrate)

As shown in FIG. 3, the LED substrate 25 has a base member that is in a horizontally long rectangular shape in a plan view, and is housed in the chassis 22 so as to extend along the bottom plate 22a with the long side direction thereof matching the X axis direction and the short side direction thereof matching the Y axis direction. Of plate surfaces of the base members of the LED substrates 25, a surface facing the front side (surface facing the optical members 23) has the LEDs 24 mounted thereon. The LEDs 24 are disposed such that the light-emitting surfaces face the optical members 23 (liquid crystal panel 11) and such that the optical axis thereof matches the Z axis direction, or in other words, the direction perpendicular to the display screen of the liquid crystal panel 11. A plurality of the LEDs 24 are arranged in parallel linear columns along the long side direction (X axis direction) of the LED substrates 25, and are connected in series by the wiring patterns (not shown) formed on the LED substrates 25. The pitch at which the respective LEDs 24 are arranged is substantially constant, which means that the respective LEDs 24 are arranged at substantially even intervals.

As shown in FIG. 3, a plurality of LED substrates 25 having the above-mentioned configuration are disposed in the chassis 22 along the X axis direction and the Y axis direction, respectively, such that the respective long sides are aligned along the same direction and the respective short sides aligned along the same direction. In other words, the LED substrates 25 and the LEDs 24 mounted thereon are arranged in the chassis 22 such that the X axis direction (long side direction of the chassis 22 and the LEDs 25) matches the row direction, and the Y axis direction (short side direction of the chassis 22 and the LED substrates 25) matches the column direction, so as to be arranged in a matrix. The base material of the LED substrates 25 is a metal such as an aluminum-type material that is the same as that of the chassis 22, and wiring patterns (not shown) made of a metal film such as copper foil are formed over the surface of the LED substrates 25 across an insulating layer, and on the outermost surface, a reflective layer (not shown) that is a highly reflective white is formed. As a result of the wiring pattern, the respective LEDs 24 arranged in a row on the respective LED substrates 25 are connected to each other in series. The base material of the LED substrate 25 can alternatively be formed of an insulating material such as a ceramic.

(Diffusion Lens)

Figure 6:
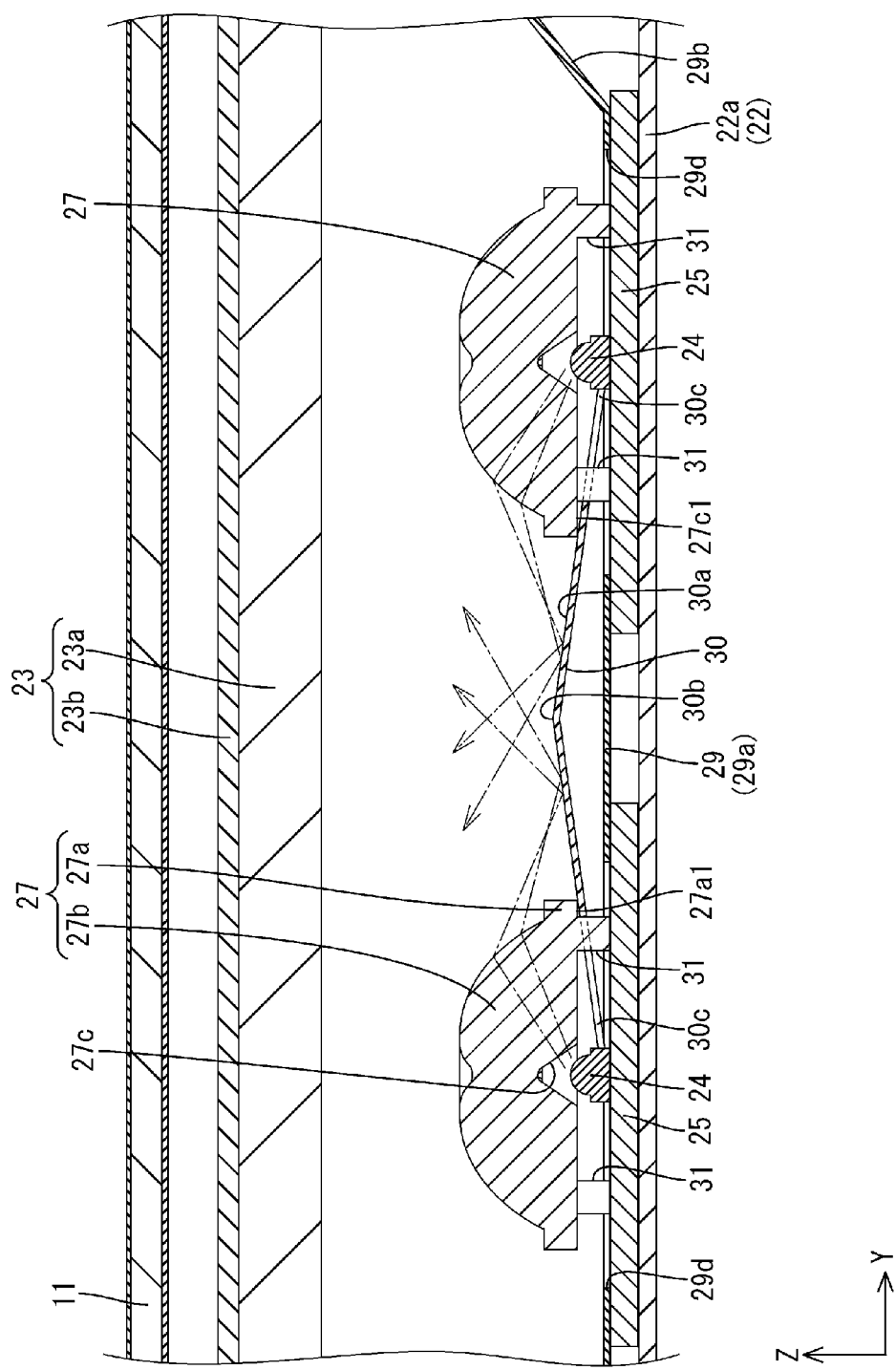
FIG. 6 shows a magnified cross-sectional view in which the vicinity of a second reflective sheet 30 in FIG. 4 is magnified.
Figure 7:
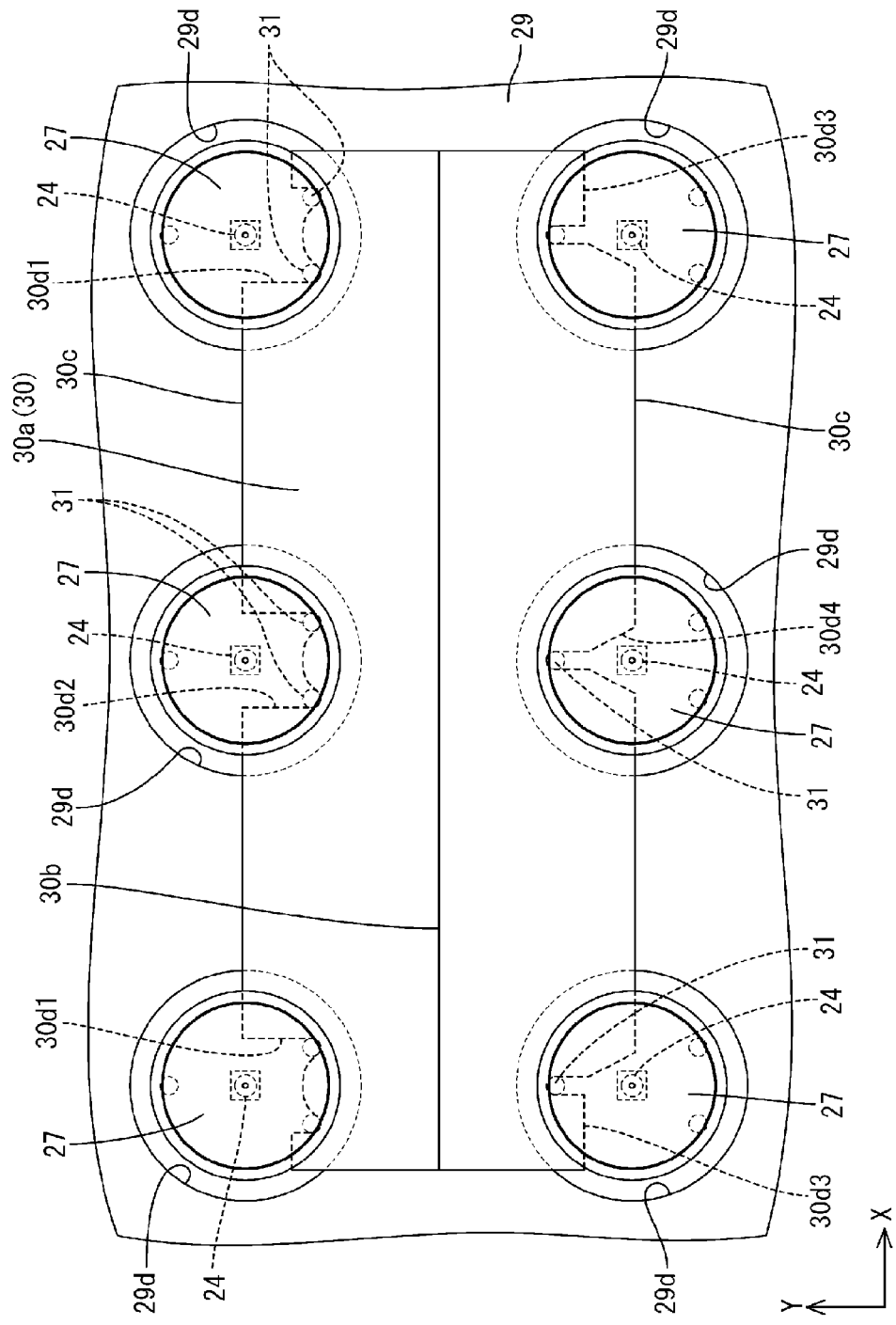
FIG. 7 shows a magnified plan view in which the vicinity of the second reflective sheet 30 is magnified.

The diffusion lenses 27 are made of a synthetic resin material (such as polycarbonate or acryl) that is almost completely transparent (having a high degree of light transmittance) and that has a refractive index higher than air. As shown in FIGS. 6 and 7, the diffusion lenses 27 have a prescribed thickness and are each formed in a substantially circular shape in a plan view. Each of the diffusion lenses 27 is attached to the LED substrate 25 so as to cover the front side of each LED 24, or in other words, so as to be placed over each LED 24 in a plan view. Specifically, the diffusion lenses 27 are positioned so as to be substantially concentric with the respective LEDs 24 in a plan view. Thus, the diffusion lenses 27 are also arranged in a matrix in the chassis 22. The diffusion lens 27 includes a base portion 27a that has a flat plate shape that is circular in a plan view, and a hemispherical portion 32b that has a flat hemispherical shape. In the vicinity of the edges of the diffusion lenses 27, three pillar-shaped support legs 31 protrude from the rear of the base portion 27a. The three support legs 31 are disposed so as to be equidistant from the center (portion that overlaps the LEDs 24) of the diffusion lens 27 in a plan view, and the support legs 31 are bonded to the surface of the LED substrate 25 by an adhesive, a thermosetting resin, or the like, for example. The diffusion lens 27 is supported on the surface of the LED substrate 25 by the support legs 31. The diffusion lens 27 can diffuse light having a high degree of directivity from the LEDs 24 and then output this light. That is, the directivity of the light emitted from the LED 24 is lessened as the light passes through the diffusion lens 27, and therefore, even when a gap between adjacent LEDs 24 is made larger, an area therebetween becomes less likely to be perceived as a dark area. This makes it possible to reduce the number of LEDs 24 that need to be provided.

(Holding Member)

The holding members 28 will be explained. The holding members 28 are made of a synthetic resin such as polycarbonate, and the surfaces thereof are a highly reflective white. As shown in FIGS. 4 and 5, the holding members 28 each have a main part 28a along the plate surface of the LED substrate 25 and a securing part 28b that protrudes from the main part 28a toward the rear side, or in other words, toward the chassis 22 and that is attached to the chassis 22. The main part 28a is formed in a substantially circular plate shape in a plan view, and can sandwich at least the LED substrate 25 with the bottom plate 22a of the chassis 22. The securing part 28b can engage the bottom plate 22a by being inserted through an insertion hole 25b and an attachment hole that are respectively formed in the LED substrate 25 and the bottom plate 22a of the chassis 22 in a position corresponding to where each holding member 28 is to be attached. A plurality of holding members 28 are appropriately dispersed throughout the surface of the LED substrate 25, and are adjacent to the respective diffusion lenses 27 (LEDs 24) with respect to the X axis direction.

The protective members 28 are of two types: a type that supports the LED substrate 25 between the main part 25a and the bottom plate 22a of the chassis 22 without a bottom part 29a of the reflective sheet 29; and a type that sandwiches the bottom part 29a of the reflective sheet 29 with the LED substrate 25, between the main part 25a and the bottom plate 22a of the chassis 22. Among them, the holding members 28 that hold the LED substrates 25 and the bottom part 29a of the reflective sheet 29 are of two types: holding members provided with supporting pins 28c that protrude from the main parts 28a toward the front side; and holding members that do not have the supporting pins 28c. The supporting pins 28c can support the optical members 23 from the rear (directly supporting the diffusion plate 23a), and as a result, it is possible to maintain an even position relation in the Z axis direction between the LEDs 24 and the optical members 23, and to mitigate unwanted deformations in the optical members 23. The holding members 28 are disposed so as not to overlap the second reflective sheets 30 to be described later in a plan view.

(First Reflective Sheet)

The first reflective sheet 29 is made of a synthetic resin, and the surface thereof is a reflective surface that is a highly reflective white. As shown in FIG. 3, the first reflective sheet 29 is large enough to be laid over substantially the entire inner surface of the chassis 22, and thus, it can simultaneously cover from the front all of the LED substrate 25 arranged within the chassis 22. The first reflective sheet 29 allows light in the chassis 22 to be efficiently directed towards the optical members 23. The first reflective sheet 29 is constituted of a bottom part 29a that is large enough to extend along the bottom plate 22a of the chassis 22 so as to cover most of the bottom plate 22a, first rising portions 29b1 that rise towards the front from the short side direction outer edges of the bottom part 29a at an incline with respect to the bottom part 29a, second rising portions 29b2 that rise towards the front from the long side direction outer edges of the bottom part 29a at an incline with respect to the bottom part 29a, and extending portions 29c that extend outward from the outer edges of the rising portions 29b1 and 29b2 and onto receiving plates 22c of the chassis 22. The bottom part 29a of the first reflective sheet 29 is disposed so as to be to the front of the front surface of the respective LED substrates 25, or in other words, to the front of the mounting surface for the LEDs 24. The bottom part 29a of the first reflective sheet 29 is provided with light source through holes 29d that are circular in a plan view in positions corresponding in a plan view with the diffusion lenses 27 (LEDs 24), the diffusion lenses 27 (LEDs 24) being inserted through the light source through holes 29d.

(Descriptions of Configurations of Main Parts of the Present Embodiment)

Next, the configuration of the second reflective sheets 30, which are the main portion of the present embodiment will be described. The plurality of second reflective sheets 30 are disposed on the first reflective sheet 29 (refer to FIG. 3), and are made of a synthetic resin and the front surface is a reflective surface that is a highly reflective white, like the first reflective sheet 29. The second reflective sheets 30 each have a rectangular shape with the long side thereof corresponding to the long side direction (X axis direction) of the chassis 22 in a plan view, and each of the second reflective sheets 30 are provided between six diffusion lenses 27 (refer to FIG. 3). Specifically, each second reflective sheet 30 has long sides that each overlap three diffusion lenses 27 aligned along the long side direction (X axis direction) of the chassis 22, and short sides that are each located between two diffusion lenses 27 aligned along the short side direction (Y axis direction) of the chassis 22. The second reflective sheets 30 are made of a flexible material, and a crease 30b is formed along a line (bisecting line along the long sides of the second reflective sheet 30) that is in the center between a pair of ends 30c and 30c constituting opposing sides in the long side direction, and the second reflective sheet 30 is folded in a mountain fold in a cross-sectional view along the crease 30b (so as to protrude towards the front) (FIGS. 4 and 6). Thus, the reflective surface on the front of the second reflective sheet 30 is an inclined surface 30a. The second reflective sheet 30, folded in a mountain fold, is disposed such that the pair of ends 30c and 30c that are opposing sides in the long side direction are housed between the first reflective sheet 29 and the respective diffusion lenses 27, and thus, are held on the first reflective sheet 29. The five second reflective sheets 30 located in the center in the long side direction (X axis direction) of the chassis 22 (second reflective sheets disposed in the center of FIG. 3) each overlap eight diffusion lenses 27 due to considerations of symmetry of the long side direction (X axis direction) of the chassis 22.

Next, the mode by which the second reflective sheets 30 are held will be described. The second reflective sheet 30 protrudes towards the front, and thus, the pair of ends 30c and 30c that are the opposing sides in the long side direction of the second reflective sheet 30 are in contact with the first reflective sheet (specifically, the portion of the first reflective sheet 29 near the LED 24; edge of the light source insertion hole 29d), and a portion of the inclined surface 30a is in contact with the rear side 27a1 of the base portion 27a of the diffusion lens 27. The second reflective sheet 30 is bent along the crease so as to protrude towards the front, and thus, in this state, an elastic recovery force acts upon the second reflective sheet 30 such that the second reflective sheet 30 pushes towards the front. As a result, a front direction force acts on a portion of the inclined surface 30a of the second reflective sheet 30 in contact with the rear side 27a1 of the base portion 27a of the diffusion lens 27, and as a result of the reaction force thereof, the pair of ends 30c and 30c, which are the opposing sides in the long side direction of the second reflective sheet 30 in contact with the first reflective sheet 29, have a rear direction force. In other words, the pair of ends 30c and 30c that are the opposing sides push the first reflective sheet 29 towards the bottom plate 22a of the chassis 22 due to the reaction force. As a result, the pair of ends 30c and 30c that are the opposing sides of the second reflective sheet 30 do not move in the front/rear direction (Z axis direction) between the first reflective sheet 29 and the diffusion lens 27, and thus, the second reflective sheet 30 is held in place on the first reflective sheet 29.

When the pair of ends 30c and 30c that are the opposing sides in the long side direction of the second reflective sheet 30 is housed between the first reflective sheet 29 and the diffusion lens 27, the support legs 31 for supporting the diffusion lens 27 as mentioned above are in the way. Thus, as shown in FIG. 7, the pair of ends 30c and 30c that are the opposing sides in the long side direction of the second reflective sheet 30 is provided with cutouts 30d1, 30d2, 30d3, and 30d4 in portions corresponding in position to the six diffusion lenses 27. When housing the second reflective sheet 30 between the first reflective sheet 29 and the diffusion lens 27, these cutouts 30d1, 30d2, 30d3, and 30d4 are in contact with (hold) the respective support legs 31, thus allowing the second reflective sheet 30 to be housed with ease. In the present embodiment, of the six diffusion lenses 27 supporting the one second reflective sheet 30, one set of three diffusion lenses 27 aligned along the long side direction (X axis direction) of the chassis 22 have two support legs 31 for each diffusion lens 27 facing the second reflective sheet 30, and the other set of three diffusion lenses 27 have one support leg 31 for each diffusion lens 27 facing the second reflective sheet 30 (refer to FIG. 7). One set of cutouts 30d1, 30d2, 30d3, and 30d4 are for holding two support legs 31 (30d1, 30d2) each, and the other set are for holding one support leg 31 each (30d3, 30d4). As a result of these cutouts 30d1, 30d2, 30d3, and 30d4 being provided, the pair of ends 30c and 30c of the second reflective sheet 30 do not overlap the LEDs 24.

Figure 8:
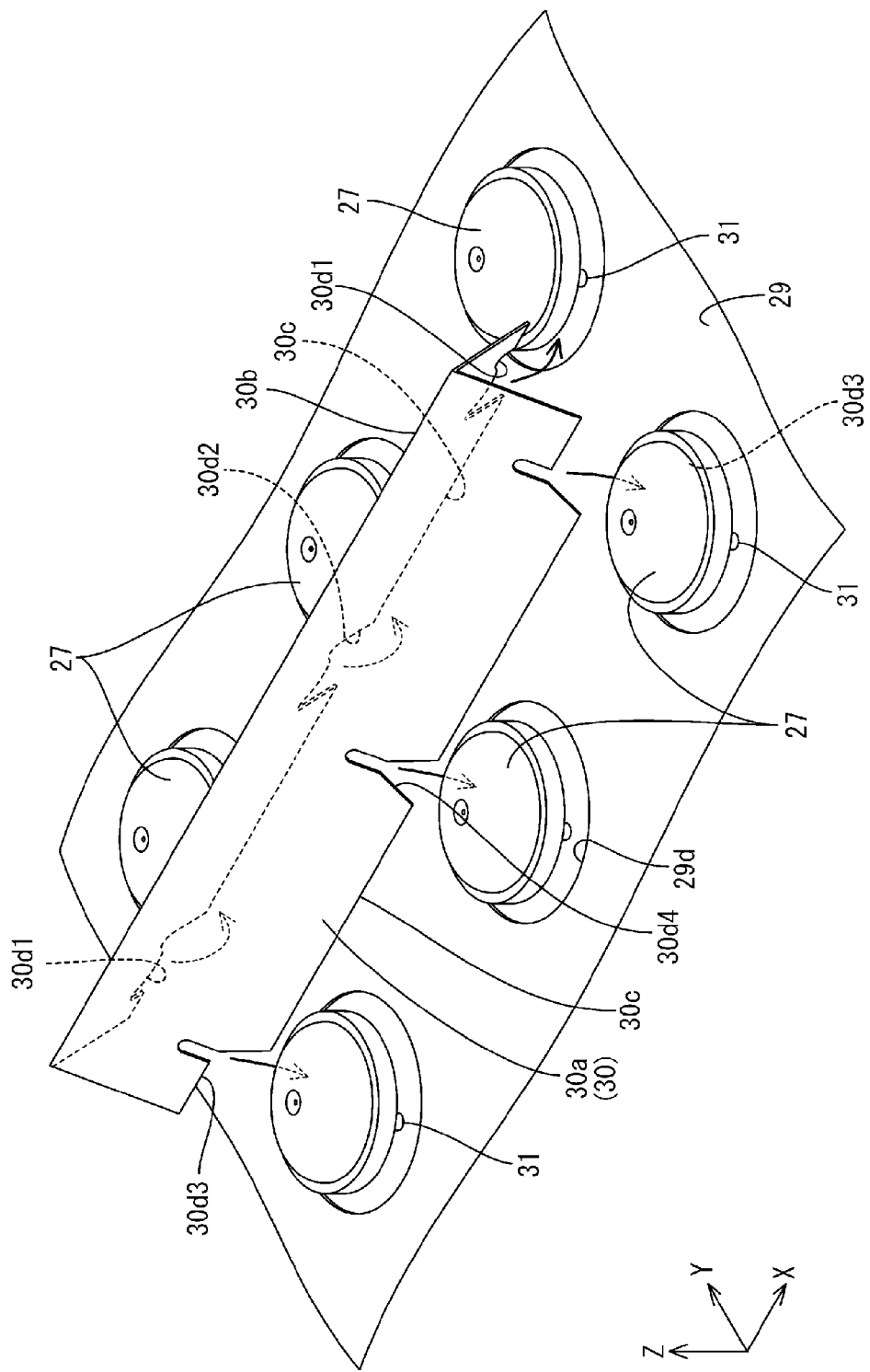
FIG. 8 is a perspective view of a step (1) of housing the second reflective sheet 30 between a first reflective sheet 29 and a plurality of diffusion lenses 27.

Next, the method of housing the second reflective sheet 30 between the first reflective sheet 29 and the six diffusion lenses 37 will be described. As shown in FIG. 8, first, the second reflective sheet 30 is prepared in a state in which it is folded along the crease 30b to a greater extent than when the second reflective sheet 30 would be when it is housed, and the position of the second reflective sheet 30 is set above the six diffusion lenses 27. In this state, the distance of a line drawn in the short side direction (Y axis direction) from end to end of each of the short ends of the second reflective sheet 30 is shorter than the distance between two diffusion lenses 27 aligned in the short side direction (Y axis direction) of the chassis 22, and thus, by lowering the second reflective sheet 30 towards the first reflective sheet 29 in this state, the position of the reflective sheet 30 can be set between the two diffusion lenses 27. The pair of ends 30c and 30c that are the opposing sides in the long side direction (X axis direction) of the second reflective sheet 30 is stored between the first reflective sheet 29 and the diffusion lenses 27 such that the support legs 31 are stored in the respective cutouts 30d1, 30d2, 30d3, and 30d4 while the bent portion of the second reflective sheet 30 in this state is gradually unbent. As a result, the second reflective sheet 30 is held between the first reflective sheet 29 and the diffusion lenses 27 while the elastic recovery force towards the front is acting on the second reflective sheet 30 (refer to FIG. 9).

By disposing a plurality of such second reflective sheets, rising of the portions of the first reflective sheet 29 in the vicinity of the LEDs 24 (edges of the light source insertion holes 29d) is prevented or mitigated, and as shown in FIG. 6, light outputted from the side of the diffusion lenses 27 (see one dot chain lines in FIG. 6) among the light outputted from the LEDs 24 and passing through the diffusion lenses 27 is reflected by the inclined surface 30a of the second reflective sheet 30, and travels towards the liquid crystal panel 11 (rear side of the optical members 23).

As described above, in the backlight device 12 of the present embodiment, the second reflective sheets 30 are held on the first reflective sheet 29 around the diffusion lenses 27, and thus, the second reflective sheets 30 prevent or mitigate the rising of the first reflective sheet 29 in portions around the LEDs 24 where the first reflective sheet 29 is susceptible to rising. Additionally, the second reflective sheets 30 protrude towards the display surface side of the liquid crystal panel 11, and thus, light that reaches the second reflective sheet 30 is reflected towards the display surface side of the liquid crystal panel 11. Thus, it is possible to have light from the LEDs 24 travel towards the display surface side of the liquid crystal panel 11 while rising of the first reflective sheet 29 in the vicinity of the LEDs 24 is prevented or mitigated. Thus, it is possible to prevent or mitigate uneven brightness in the display surface of the liquid crystal panel 11 with a simple configuration.

In the backlight device 12 of the present embodiment, it is possible to prevent the rising of the first reflective sheet 29 in the vicinity of the LEDs 24 using the second reflective sheets 30 without providing fixing members or the like on the chassis 22, and thus, compared to conventional backlight devices in which the fixing members for fixing the first reflective sheet 29 in place have tips that protrude from the rear side of the chassis 22, it is possible to install circuit substrates and the like with ease on the rear side of the bottom plate of the chassis 22.

Also, in the backlight device 12 of the present embodiment, the second reflective sheets 30 are disposed such that an elastic recovery force towards the display surface side of the liquid crystal panel 11 acts thereon, and the pair of ends 30c and 30c that are the pair of opposing sides are in elastic contact with the diffusion lenses 27 while being held between the first reflective sheet 29 and the six diffusion lenses 27, which causes the first reflective sheet 29 to be pressed towards the bottom plate 22a of the chassis 22 due to the reaction force. As a result, when the second reflective sheets 30 are in elastic contact with the diffusion lenses 27 while having an elastic recovery force towards the display surface side of the liquid crystal panel 11 acting thereon, the reaction force towards the first reflective sheet 29 acts on the pair of ends 30c and 30c that are the opposing sides of the second reflective sheet 30. As a result, portions of the first reflective sheet 29 around the diffusion lenses 27 are effectively pressed towards the bottom plate 22a of the chassis 22, which further prevents or mitigates rising of the first reflective sheet 29 in the vicinity of the LEDs 24.

In the backlight device 12 of the present embodiment, the second reflective sheets 30 have creases 30b provided between and along the pair of ends 30c and 30c that are the opposite sides, and the second reflective sheet 30 is bent in a mountain fold along the crease 30b so as to be in a mountain shape in a cross-sectional view. With the second reflective sheet 30 bent in a mountain fold, the inclined surface 30a is in contact with the diffusion lens 27, causing the second reflective sheet 30 to bend slightly towards the first reflective sheet 29, which allows the second reflective sheet 30 to effectively press down the first reflective sheet 29. Additionally, the light that reaches the second reflective sheet 30 reaches the inclined surface 30a of the second reflective sheet 30, which is bent in a mountain fold, and thus, the light can be effectively reflected towards the display surface side of the liquid crystal panel 11. In this manner, the rising of the first reflective sheet 29 in the vicinity of the LEDs 24 is prevented or mitigated, which allows the realization of a specific configuration for causing light from the LEDs 24 to travel towards the display surface side of the liquid crystal panel 11.

Also, in the backlight device 12 of the present embodiment, the creases 30b are provided along a center line between the pair of ends 30c and 30c that are opposing sides. Thus, the tip of the second reflective sheet 30 with a mountain shape in a cross-sectional view is along the center between the six diffusion lenses 27, which sandwich the second reflective sheet 30, and thus, light that is outputted from the diffusion lenses 27 and that reaches the inclined surface 30a of the second reflective sheet 30 can be evenly distributed across the display surface side of the liquid crystal panel 11.

Also, in the backlight device 12 of the present embodiment, the second reflective sheet overlaps the six diffusion lenses 27. Thus, the second reflective sheet 30 is in contact with the six diffusion lenses 27, and the first reflective sheet 29 can be effectively pushed down by the second reflective sheets 30.

In the backlight device 12 of the present embodiment, three support legs 31 are provided on the LED substrate 25 to support each diffusion lens 27, and cutouts 30d1, 30d2, 30d3, and 30d4 that can house the respective supporting legs 31 are provided in the pair of ends 30c and 30c that are the opposing sides of the second reflective sheet 30. Thus, it is possible to house the second reflective sheets 30 with ease between the first reflective sheet 29 and the diffusion lens 27 while attaining a configuration in which the one diffusion lens 27 is supported by the three support legs 31.

In the backlight device 12 of the present embodiment, the cutouts 30d1, 30d2, 30d3, and 30d4 are made large enough to engage the plurality of support legs 31 respectively supporting the six diffusion lenses 27 in a direction along the surface of the first reflective sheet 29. As a result, the second reflective sheets 30 are held in a direction along the surface of the first reflective sheet 29, and thus, the pair of ends 30c and 30c that are the opposing sides of the second reflective sheet 30 can be made difficult to remove from between the first reflective sheet 29 and the diffusion lenses 27.

In the backlight device 12 of the present embodiment, the second reflective sheets 30 are arranged at equal intervals while overlapping six diffusion lenses 27. As a result, it is possible to dispose the plurality of second reflective sheets 30 with ease on the first reflective sheet 29 in the chassis 22.

Also, in the backlight device 12 of the present embodiment, LEDs 24 and light source substrates 25 are disposed such that the LEDs 24 are in a matrix when viewing the bottom plate 22a of the chassis 22 in a plan view. Thus, it is possible to dispose the plurality of second reflective sheets 30 at an even distribution in a plan view, and it is possible to reflect light from the plurality of LEDs 24 evenly across the display surface side of the liquid crystal panel 11 by the second reflective sheets 30.

Embodiment 2

Figure 9:
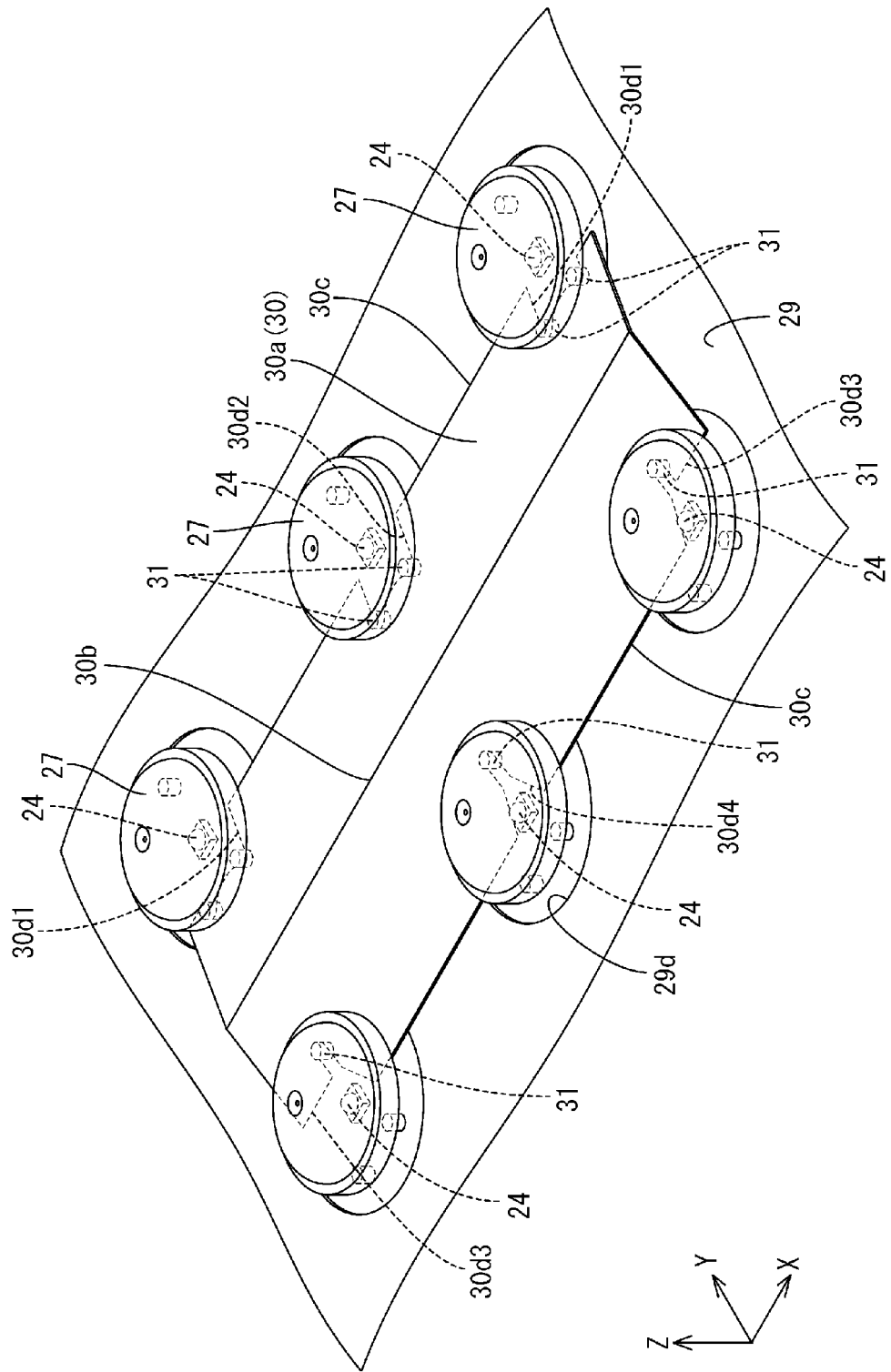
FIG. 9 is a perspective view of a step (2) of housing the second reflective sheet 30 between a first reflective sheet 29 and a plurality of diffusion lenses 27.

Embodiment 2 will be described with reference to the drawings. Embodiment 2 differs from Embodiment 1 in terms of the size of second reflective sheets 130 and the number of diffusion lenses 127 in contact with each second reflective sheet 130. Other elements are similar to those of Embodiment 1, and therefore, descriptions of the configurations, the operation, and the effect will be omitted. Parts in FIG. 10 that have 100 added to the reference characters of FIG. 9 are the same as these parts described in Embodiment 1.

Figure 10:
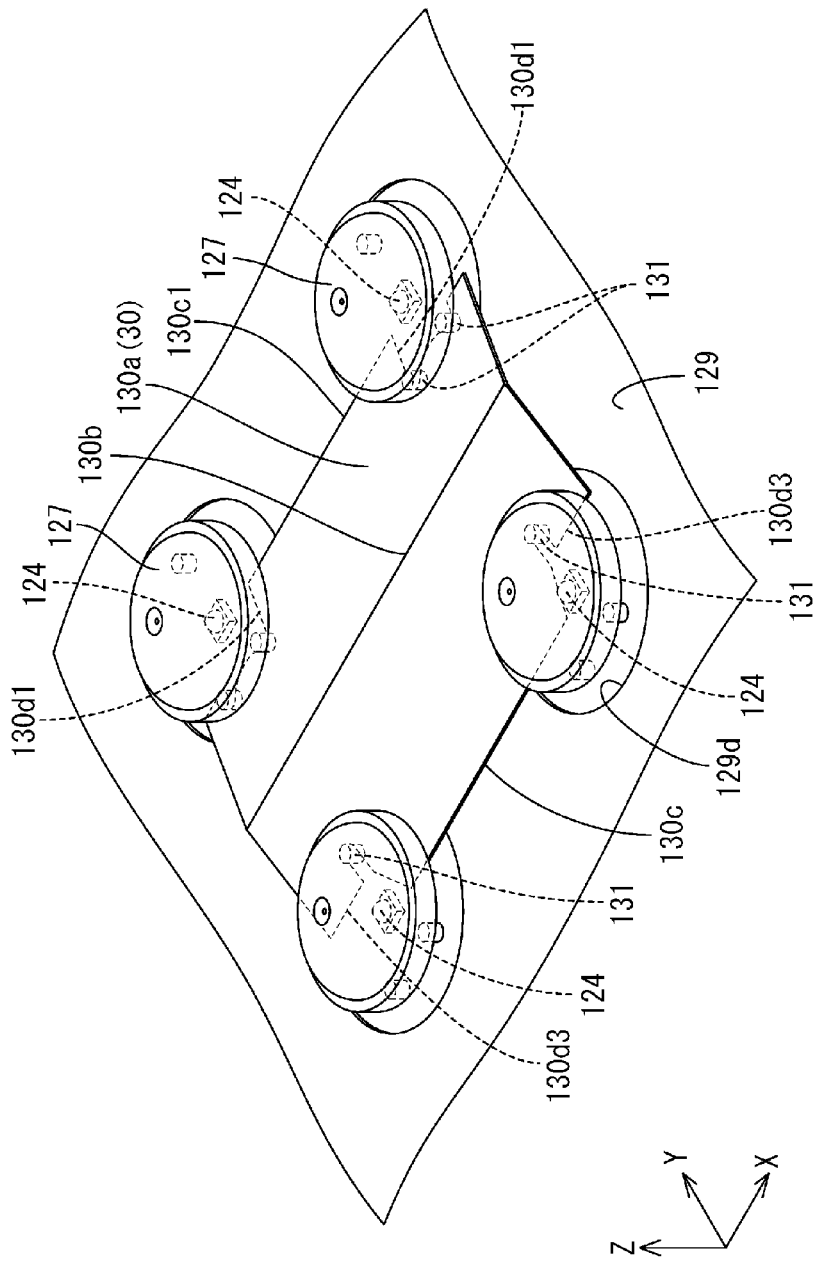
FIG. 10 shows a magnified perspective view of the vicinity of a second reflective sheet 130 of Embodiment 2.

In the backlight device of Embodiment 2, as shown in FIG. 10, one second reflective sheet 130 is disposed between four diffusion lenses 127. Specifically, each second reflective sheet 130 has long sides that each overlap two diffusion lenses 127 aligned along the long side direction (X axis direction) of the chassis, and short sides that are each located between two diffusion lenses 127 aligned along the short side direction (Y axis direction) of the chassis. Even in such a configuration, the second reflective sheets 130 prevent or mitigate rising of portions of a first reflective sheet 129 in the vicinity of LEDs 124 (edge of light source insertion holes 129d), and thus, it is possible to prevent or mitigate uneven brightness in the display surface of the liquid crystal panel with a simple configuration.

Embodiment 3

Embodiment 3 will be described with reference to the drawings. Embodiment 3 differs from Embodiment 1 in terms of the bending state of second reflective sheets 230. Other elements are similar to those of Embodiment 1, and therefore, descriptions of the configurations, the operation, and the effect will be omitted. Parts in FIG. 11 that have 200 added to the reference characters of FIG. 6 are the same as these parts described in Embodiment 1.

Figure 11:
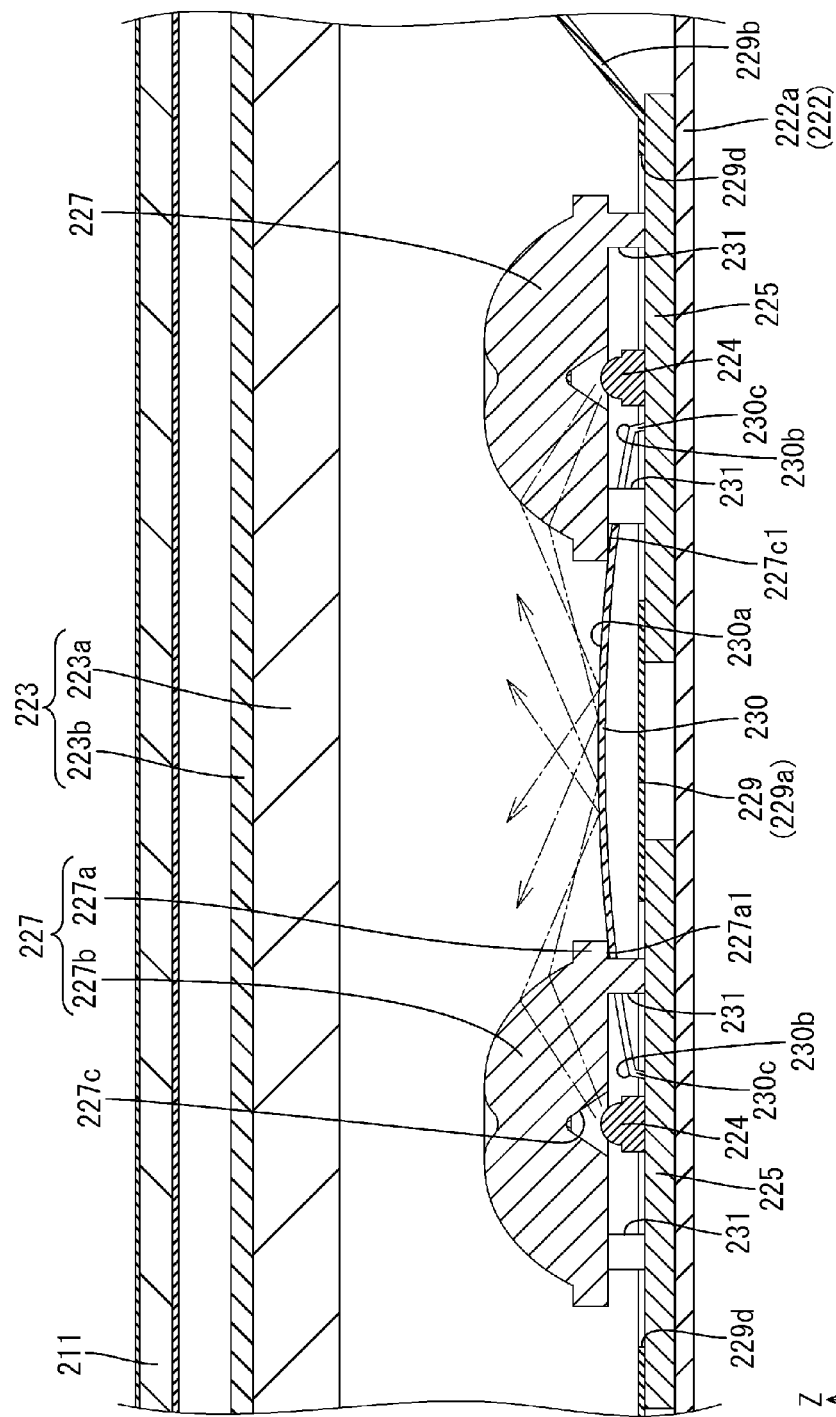
FIG. 11 shows a magnified cross-sectional view of the vicinity of a second reflective sheet 230 of Embodiment 3.

As shown in FIG. 11, in the backlight device of Embodiment 3, each second reflective sheet 230 is provided with creases 230b in the vicinity of a pair of ends 230c and 230c that are a pair of opposing sides in the long side direction, each crease 230b being located between a first reflective sheet 229 and a diffusion lens 227, and the second reflective sheet 230 is given a mountain fold along the crease 230b so as to form a mountain shape in a cross-sectional view. The portion of the second reflective sheet 230 between the two creases 230b has a curved surface 230a that protrudes towards the front, and has an elastic recovery force acting thereon towards the front. In the second reflective sheet 230, the pair of ends 230c and 230c that are the opposing sides in the long side direction are in contact with the first reflective sheet 229 (specifically, the portion of the first reflective sheet 229 in the vicinity of an LED 224 and an edge of a light source insertion hole 229d), and a portion of the curved surface 230a is in contact with a rear side 227a1 of a base portion 227a of the diffusion lens 227. As a result, the pair of ends 230c and 230c that are the opposing sides of the second reflective sheet 230 do not move in the front/rear direction (Z axis direction) between the first reflective sheet 229 and the diffusion lens 227, and the second reflective sheet 230 is held on the first reflective sheet 229. Even in a configuration in which the second reflective sheets 230 are held in this state, the second reflective sheet 230 prevents or mitigates rising of portions of the first reflective sheet 229 in the vicinity of the LEDs 224 (edges of the light source insertion holes 229d), and thus, it is possible to prevent or mitigate uneven brightness in the display surface of the liquid crystal panel 211 with a simple configuration.

Modification examples of the respective embodiments above will be described below.

(1) In the embodiments above, configurations where shown in which each second reflective sheet is housed between the first reflective sheet and six or four diffusion lenses, but the number of diffusion lenses for housing each second reflective sheet is not limited. As long as there are a plurality of diffusion lenses, the second reflective sheet may be housed between the first reflective sheet and two diffusion lenses, for example.

(2) In the embodiments above, the LEDs and diffusion lenses are arranged in a matrix on the bottom plate of the chassis, but the LEDs and diffusion lenses may be arranged at random. Even in such a case, by housing each first second reflective sheet between the first reflective sheet and a plurality of diffusion lenses, it is possible to prevent rising of the first reflective sheet in the vicinity of the LEDs.

(3) In the embodiments above, an example was described of the second reflective sheets being rectangular, but the shape of the second reflective sheets is not limited thereto. For example, the second reflective sheet may be elliptical. Even in such a case, by housing each second reflective sheet between the first reflective sheet and a plurality of diffusion lenses, it is possible to prevent rising of the first reflective sheet in the vicinity of the LEDs.

(4) In the embodiments above, an example was described in which the second reflective sheets are provided with creases, but a configuration may be used in which the creases are not provided. For example, the second reflective sheets may have an arch shape that protrudes towards the display surface side of the liquid crystal panel.

(5) Besides the embodiments above, the shape, configuration, and the like of the second reflective sheets can be modified as appropriate.

(6) Besides the embodiments above, the state in which the second reflective sheets are held between the first reflective sheet and the plurality of diffusion lenses can be modified as appropriate.

(7) In the respective embodiments above, a liquid crystal display device using a liquid crystal panel as a display panel was shown as an example, but the present invention is also applicable to a display device that uses another type of display panel.

(8) In the respective embodiments above, a television receiver that includes a tuner was shown as an example, but the present invention is also applicable to a display device without a tuner.

Embodiments of the present invention were described above in detail, but these are merely examples, and do not limit the scope defined by the claims. The technical scope defined by the claims includes various modifications of the specific examples described above.

Also, the technical elements described in the present specification or shown in the drawings realize technical utility each on their own or through a combination of various technical elements, and are not limited to the combinations defined by the claims at the time of filing. Also, the techniques described in the present specification or shown in the drawings can accomplish a plurality of objects simultaneously, and each one of the objects on its own has technical utility.

DESCRIPTION OF REFERENCE CHARACTERS

TV television receiver
Ca, Cb cabinet
T tuner
VC image conversion circuit substrate
S stand
10 liquid crystal display device
11, 211 liquid crystal panel
12 backlight device
13 bezel
22, 222 chassis
22a, 222a bottom plate
23, 223 optical members
24, 124, 224 LED
25, 225 LED substrate
26 frame
27, 127, 227 diffusion lens
29, 129, 229 first reflective sheet
30, 130, 230 second reflective sheet
30b, 130b, 230b crease

The invention claimed is:

1. An illumination device, comprising:
a chassis having a plate-shaped portion and side plates that rise up from edges of the plate-shaped portion on one surface thereof;
a plurality of light source substrates disposed on the one surface of the plate-shaped portion;
a plurality of light sources disposed on the light source substrates, the light sources outputting light in a direction of light output;
a plurality of diffusion lenses respectively covering the plurality of light sources to diffuse light from the light sources;
a reflective sheet disposed on the one surface of the plate-shaped portion and the light source substrates, the reflective sheet having light source insertion holes that correspond in position to the light sources to insert the light sources therethrough; and
a flat spring member over the reflective sheet, the flat spring member generally protruding outward from a plane defined by the reflective sheet and having a pair of ends that oppose each other, one of the ends being held by the reflective sheet and one of the plurality of diffusion lenses, another end of the flat spring member being held by the reflective sheet and another of the diffusion lenses so that the ends of the flat spring member are respectively in contact with said one and another diffusion lenses and the reflective sheet to secure the reflective sheet onto the light source substrates, the flat spring member being reflective.

2. The illumination device according to claim 1, wherein the flat spring member is disposed in an extended state such that an elastic recovery force is generated so that each of said pair of ends thereof presses the reflective sheet towards the plate-shaped portion of the chassis by a reaction force resulting from each of the pair of ends being held by the reflective sheet and said one and another diffusion lenses to be in elastic contact with the diffusion lenses.

3. The illumination device according to claim 1, wherein the flat spring member has a crease provided between and along the pair of ends thereof, the flat spring member being folded along the crease in a mountain fold so as to have a mountain shape in a cross-sectional view.

4. The illumination device according to claim 3, wherein the crease is provided along a center line between the pair of ends.

5. The illumination device according to claim 1, wherein the flat spring member is disposed so as to overlap at least four of the diffusion lenses.

6. The illumination device according to claim 1,
wherein support legs that support the diffusion lenses are provided on the light source substrates, and
wherein the pair of ends of the flat spring member is provided with cutouts.

7. The illumination device according to claim 6, wherein the cutouts are large enough to engage a plurality of said support legs that support the plurality of diffusion lenses.

8. The illumination device according to claim 1, wherein a plurality of said flat spring members are arranged at equal intervals while respectively overlapping the plurality of diffusion lenses.

9. The illumination device according to claim 8, wherein the light sources and the light source substrates are disposed such that the light sources are in a matrix when the plate-shaped portion is viewed in a plan view.

10. The illumination device according to claim 1, wherein the flat spring member is white on a surface thereof facing the direction of light output.

11. A display device, comprising a display panel that performs display using light from the illumination device according to claim 1.

12. The display device according to claim 11, wherein the display panel is a liquid crystal panel using liquid crystal.

13. A television receiver, comprising: the display device according to claim 11.

* * * * *